(12) United States Patent
Giasson (10) Patent No.: US 7,311,354 B2
(45) Date of Patent: Dec. 25, 2007

(54) SEAT FOR AIRCRAFT (75) Inventor: Brigitte Giasson, Outremont (CA)

(73) Assignee: 3861589 Canada Inc., Outremont, Quebec (CA)

( * ) Notice: Subject to any disclaimer, the term of this patent is extended or adjusted under 35 U.S.C. 154(b) by 358 days.

(21) Appl. No.: 10/836,114

(22) Filed: Apr. 30, 2004

(65) Prior Publication Data
US 2005/0012375 A1 Jan. 20, 2005

Related U.S. Application Data (60) Provisional application No. 60/466,469, filed on Apr. 30, 2003.

(51) Int. Cl.
A47B 83/02 (2006.01)

(52) U.S. Cl. ........................ 297/161; 297/162; 297/145

(58) Field of Classification Search ........ 297/160–162, 297/173, 354.13, 217.6, 398, 406, 145, 410; 108/147.19; 248/118.3
See application file for complete search history.

(56) References Cited

U.S. PATENT DOCUMENTS

| | | | | |
|---|---|---|---|---|
| 2,833,502 A | * | 5/1958 | Wildeboor | 248/231.41 |
| 3,467,432 A | * | 9/1969 | Sullivan | 297/162 |
| 5,195,709 A | * | 3/1993 | Yasushi | 248/280.11 |
| 5,536,070 A | * | 7/1996 | Lemmen | 297/411.37 |
| 5,547,247 A | * | 8/1996 | Dixon | 297/145 |
| 5,562,049 A | * | 10/1996 | Hoffman et al. | 108/94 |
| 5,683,136 A | * | 11/1997 | Baumann et al. | 297/162 |
| 5,788,183 A | * | 8/1998 | Marechal | 244/118.6 |
| 5,795,018 A | * | 8/1998 | Schumacher et al. | 297/184.17 |
| 5,927,799 A | * | 7/1999 | Tornero | 297/145 |
| 5,984,415 A | * | 11/1999 | Schumacher et al. | 297/411.2 |
| 6,220,658 B1 | * | 4/2001 | Lukawski et al. | 297/145 |
| 6,250,716 B1 | * | 6/2001 | Clough | 297/408 |
| 6,276,635 B1 | * | 8/2001 | Ferry et al. | 244/118.6 |
| 6,412,870 B1 | * | 7/2002 | Higgins et al. | 297/342 |
| 6,494,536 B2 | * | 12/2002 | Plant | 297/284.11 |
| 6,793,281 B2 | * | 9/2004 | Duerr et al. | 297/147 |
| 6,820,929 B2 | * | 11/2004 | Edrich et al. | 297/61 |

* cited by examiner

Primary Examiner—David Dunn
Assistant Examiner—Tania Abraham
(74) Attorney, Agent, or Firm—Ogilvy Renault LLP (57) ABSTRACT

A seat for aircraft provided with integrated components for the user's comfort includes an outboard armrest to which is mounted a folding table that is movable between a stowed position where it lies on top of the armrest to an operational position. The armrest also includes a monitor and other components.

19 Claims, 11 Drawing Sheets

SEAT FOR AIRCRAFT

CROSS-REFERENCE TO RELATED APPLICATIONS

This application claims the benefits of provisional U.S. patent application Ser. No. 60/466,469 filed on Apr. 30, 2003, the disclosure of which is hereby incorporated herein by reference in its entirety.

FIELD OF THE INVENTION

The present invention relates to a seat for aircraft. More specifically, but not exclusively, the present invention is concerned with a seat for aircraft wherein most of the equipment required for the occupant's comfort is integrated to the seat.

BACKGROUND OF THE INVENTION

Many designs for aircraft seats have been proposed over the years. Some of these seats are designed for commercial airplanes transporting hundreds of passengers. These seats must be relatively small and some of the equipment required for the occupant's comfort are associated with the seat of the next forward row, such as, the folding table.

Other designs of aircraft seats are designed for smaller commercial aircrafts, for example business jets. These seats often lack any equipment necessary for the occupant's comfort since these elements are integrated with a side ledge of the aircraft, usually adjacent to the fuselage. A major drawback of such an arrangement arises when the configuration of the seats has to be changed. Indeed, since the comfort equipment is separate from the seat, one must move and adjust each element independently.

OBJECTS OF THE INVENTION

An object of the present invention is therefore to provide an improved seat for aircraft.

SUMMARY OF THE INVENTION

According to an aspect of the present invention, there is therefore provided an aircraft seat comprising a seat base, a seat portion mounted to said seat base, a backrest portion cooperating with said seat portion for receiving a person in a seated position, an armrest defining a top portion, a folding table supported by said armrest movable between a stowed position where said folding table covers said top portion of said armrest and an operational position adapted for use by said seated person.

According to another aspect of the present invention, there is provided an armrest for an aircraft seat; said armrest having a top wall and including a folding table so mounted thereto as to be movable between a stowed position where it lies adjacent to said top wall of said armrest and a operational position where it lies generally parallel to said seat portion.

According to another aspect of the present invention, there is provided an armrest for an aircraft seat defining a top portion and an enclosure and comprising at least one component in said enclosure for use by a person seated in said aircraft seat, a folding table movable between a stowed position where said folding table covers said top portion of said armrest covering said component in said armrest and an operational position adapted for use by a person seated in said aircraft seat, said folding table in said operational position uncovering said component allowing access thereto.

The foregoing and other objects, advantages and features of the present invention will become more apparent upon reading of the following non restrictive description of an illustrative embodiment thereof, given by way of example only with reference to the accompanying drawings.

BRIEF DESCRIPTION OF THE DRAWINGS

In the appended drawings:

FIG. 3 is a top plan view of the seat for aircraft of FIG. 1;

DETAILED DESCRIPTION

A seat for aircraft according to an embodiment of the present invention includes specific elements or components that may be interrelated together, such as for example a table, a monitor/touch screen, armrests, a backrest, a headrest, a leg rest, a personal light assembly, lever controls, and a seat base.

Of course, also provided on aircraft seats according to embodiments of the present invention are specific functions and characteristics when used in an airplane, regarding seat performance standards, seat orientation, electrical connections, positive body restraint, seat controls, inclinations, displacements of the whole seat assembly, kinematics and adjustments, quality characteristics, structure, seat positions and body support.

An illustrative embodiment of the multi-functional seat for aircraft according to the present invention will now be described with reference to the attached figures.

Figure 1:
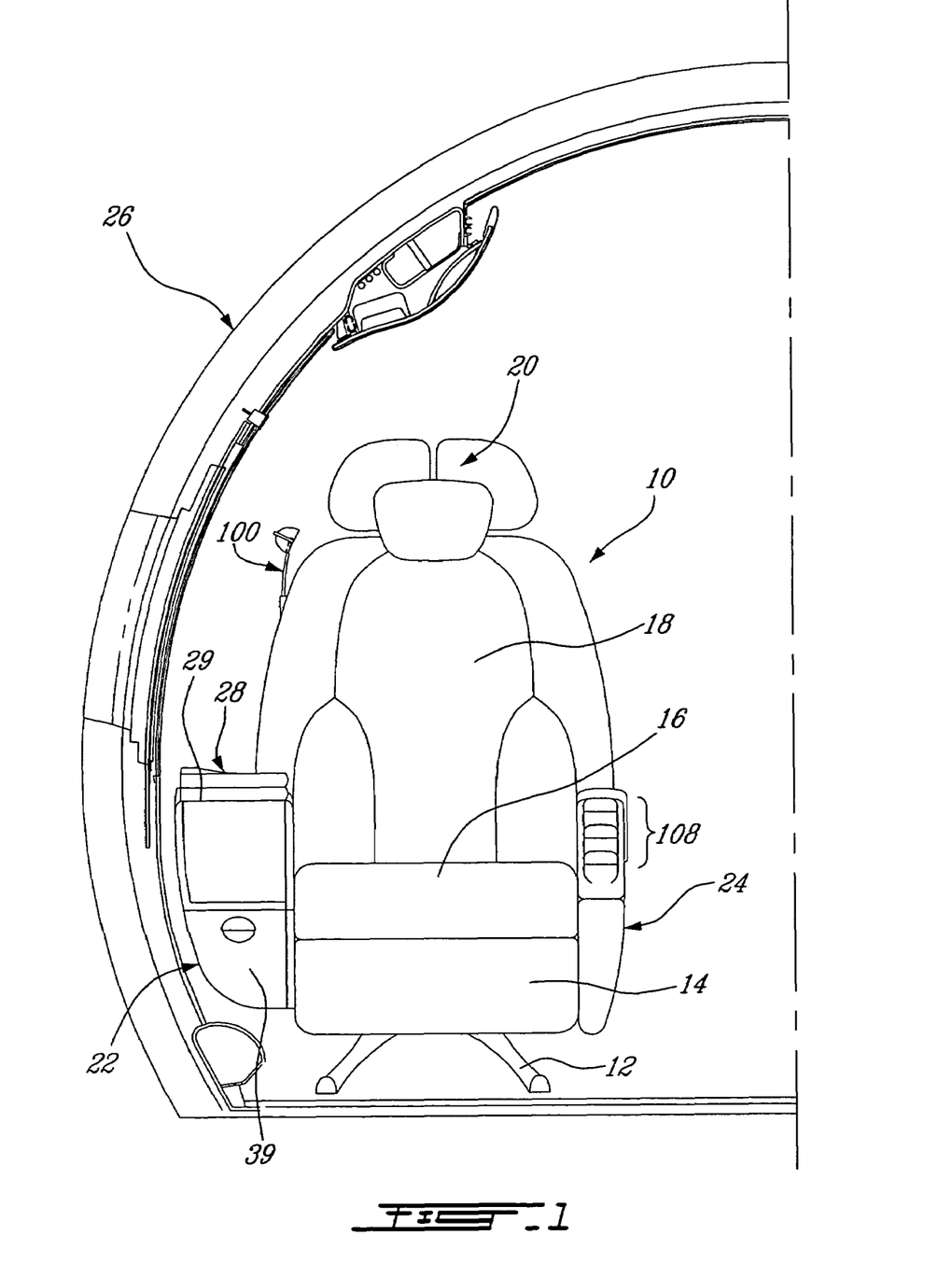
FIG. 1 is a front elevational view of a seat for aircraft according to an illustrative embodiment of the present invention.
Figure 2:
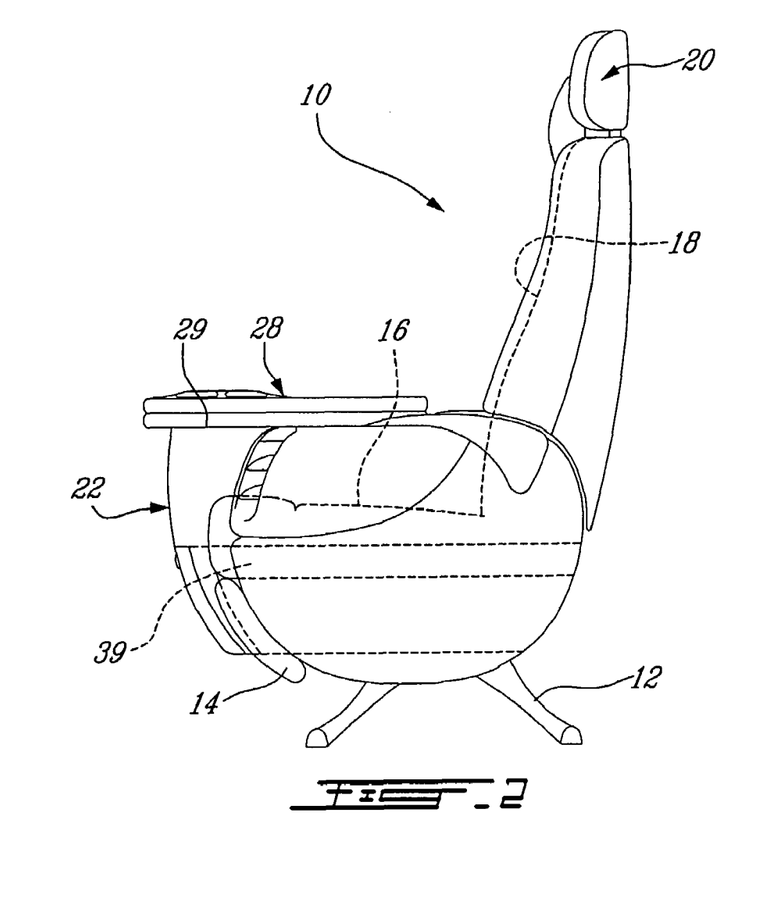
FIG. 2 is a side elevational view of the seat of FIG. 1.

Referring to FIG. 1, the illustrative embodiment of the multi-functional seat for aircraft, generally identified by the reference 10, generally comprises a seat base 12, a leg rest 14, a seat portion 16, a backrest 18, a headrest assembly 20, an outboard armrest 22 and an inboard armrest 24.

In the illustrative embodiment, the "outboard" localization generally refers to the localization of the seat 10 which is closer to the airplane fuselage 26. The outboard armrest 22 of the seat 10 therefore means that the armrest 22 is located near the fuselage 26.

As seen in FIG. 1, the outboard armrest 22 is used to hold or support a folding table 28 which, among other things, may function as a sliding lid, to cover the integrated elements of the outboard armrest 22 as will be described hereinbelow. The folding table 28, when in its stowed position illustrated in FIG. 1, is adjacent to a top wall 29 of the outboard armrest 22.

Turning now to FIG. 3 of the appended drawings, which illustrates a top plan view of the seat 10 with the folding table 28 in its folded position, it is shown that the top portion of the folding table 28 includes two integrally formed drink holders 30.

Figure 9:
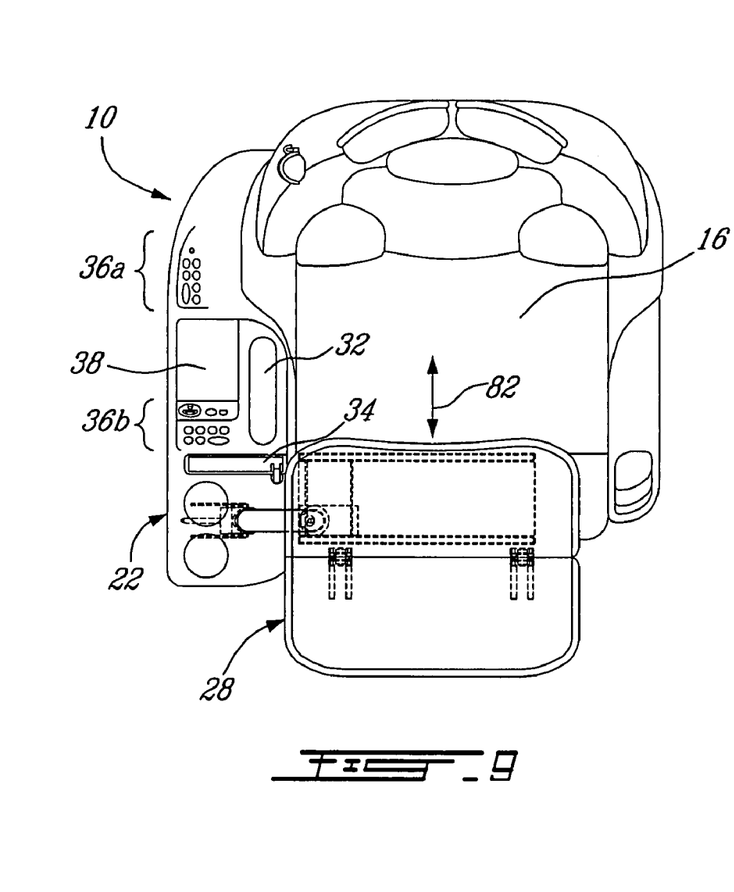
FIG. 9 is a top plan view of the seat for aircraft of FIG. 1, showing translation of the folding table to an operational position.

In FIG. 9, which is similar to FIG. 3 but shows the folding table 28 in its operational position where it rests generally parallel to the seat portion 16, the various comfort elements of the seat 10 integrated with the armrest 22 are revealed. In the illustrated seat 10, these elements include a telephone handset 32, a monitor/touch screen 34, controls for the audio entertainment and reading light 36A; video and seat adjustment controls and modem and printer connections 36B and first and second storage compartments 38 and 39 (FIG. 1). These various elements will be described in greater detail hereinbelow.

The first storage compartment 38, better seen in FIG. 9, may be used, for example, for storing a stereo headset when not in use. The second storage compartment 39 (FIG. 1) may be used to store the life vest and other safety equipment (not shown).

Figure 10:
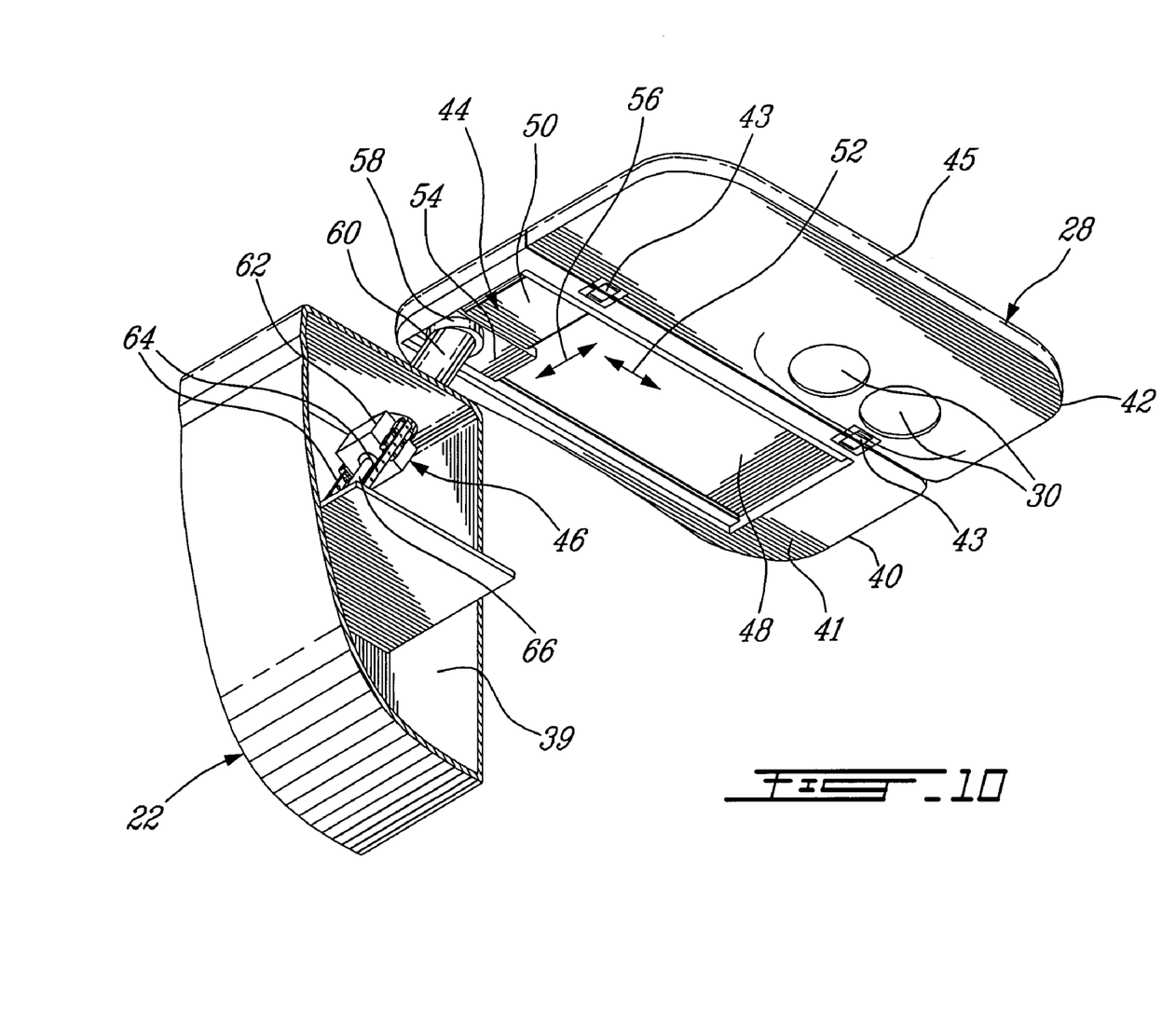
FIG. 10 is a perspective view of the folding table.

Turning now to FIGS. 3 to 10, the folding table 28 will be described. As seen in FIG. 10, the folding table 28 generally includes a rear table portion 40, a front table portion 42 secured to the rear table portion 40 via hinges 43, a sliding arrangement 44 and a telescoping arrangement 46 provided between the sliding arrangement 44 and the armrest 22.

The top of the front table portion 42 includes the cup holders 30 while the bottom of the rear portion includes the sliding arrangement.

It is to be noted that the front edge 45 of the front table portion 42 is straight to allow two facing tables to form a larger table when two seats such as 10 are positioned face to face. The rear edge of the rear table portion 40 is curved for better comfort.

The sliding arrangement 44 includes a wide channel 48 provided in the bottom surface 41 of the rear table portion 40. The channel 48 is configured and sized to receive a sliding element 50 configured and sized to slide along a longitudinal axis of the table 28 (see double arrow 52). A bracket 54 is so mounted to the sliding element 50 as to slide along a transversal axis of the table 28 (see double arrow 56). Accordingly, sliding movements along two orthogonal axes are possible.

The interconnection between the sliding arrangement 44 and the telescoping arrangement 46 is done via a pivoting element 58 that allows the pivoting of the bracket 54 with respect to a cylinder 60. It is to be noted that the pivoting axis is not parallel to the axis of the cylinder 60 but is generally vertical, allowing the table 28 to pivot generally horizontally.

The cylinder 60 is mounted to a block 62 riding on rails 64 so as to slide outwardly along its longitudinal axis. A piston 66 telescopes inside the cylinder 60 and has a distal end (not shown) secured to the armrest 22. As illustrated in FIG. 10, the telescoping arrangement moves the folding table 28 along a predetermined direction defining an angle having vertical and horizontal components.

The folding table 28 also includes a locking mechanism (not shown) that allows the user to lock the folding table in position.

FIGS. 3 to 9 illustrate the movements of the folding table from its completely folded position (FIG. 3) to its fully operational position (FIG. 9).

The completely folded position illustrated in FIG. 3 is the position of the folding table 28 for taxi, take off and landing. Therefore, a locking mechanism (not shown) is provided to maintain the folding table 28 in this position. It is to be noted that some of the controls 36 are available while the folding table is in this position.

Figure 4:
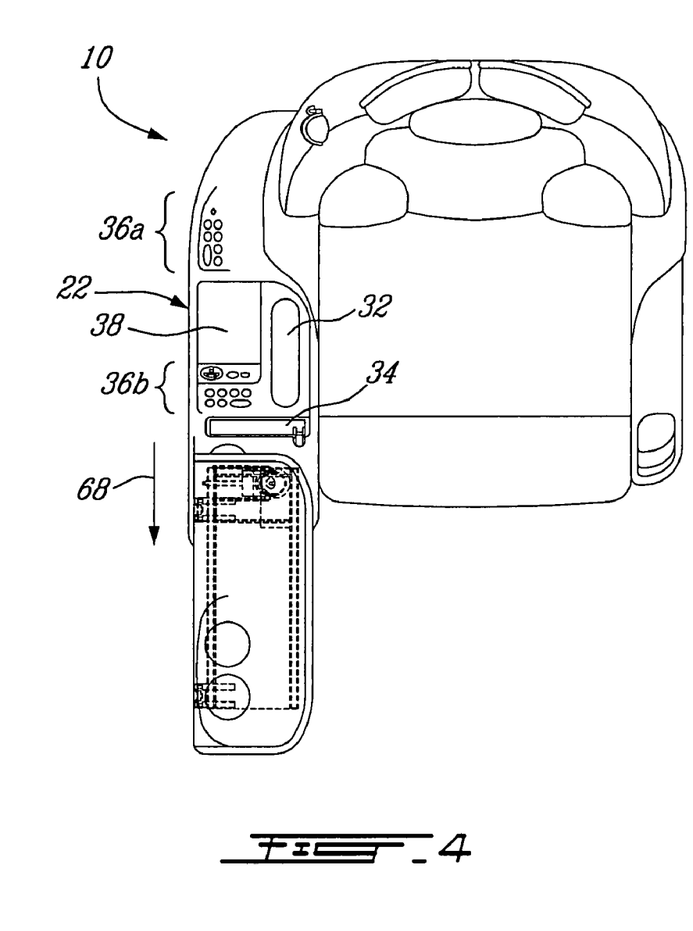
FIG. 4 is a top plan view of the seat for aircraft of FIG. 1, showing a translation movement of the folding table, revealing the elements positioned underneath.

FIG. 4 illustrates the folding table 28 which has been forwardly translated (see arrow 68). This forward movement revealed the other comfort elements of the armrest 22. The user may therefore use the telephone 34, the monitor 34, the controls 36A and 36B and the compartment 38 when the folding table 28 is in this position.

Figure 5:
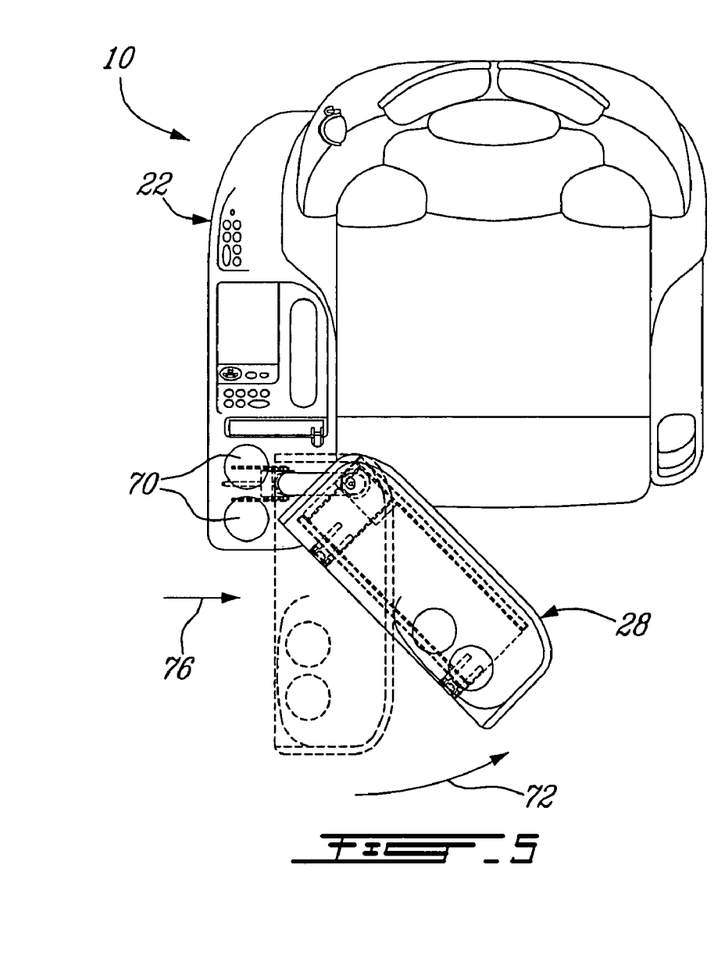
FIG. 5 is a top plan view of the seat for aircraft of FIG. 1, showing a pivoting movement of the folding table.
Figure 6:
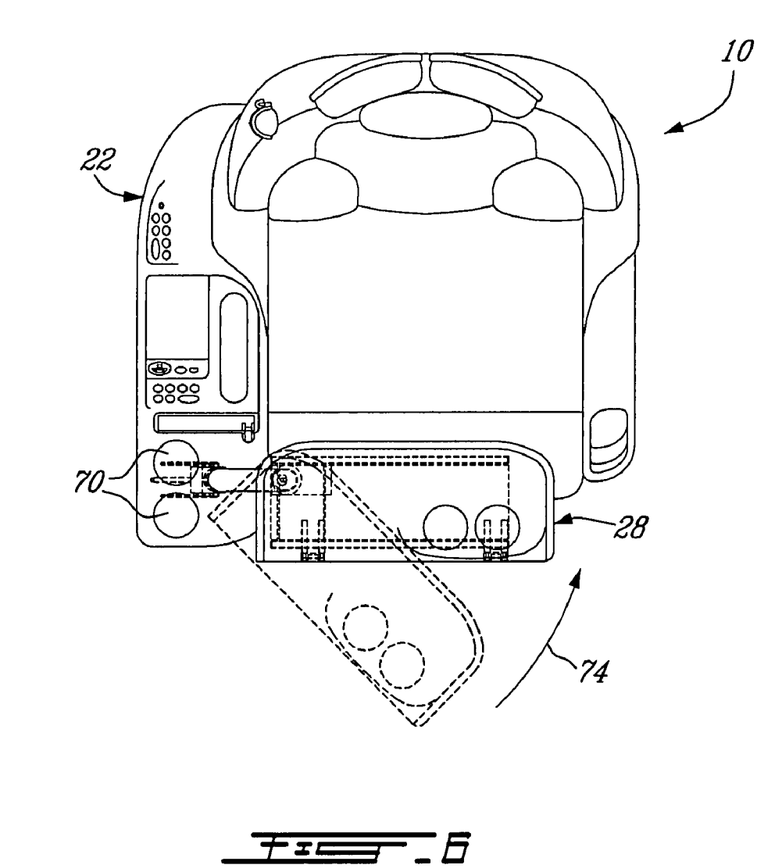
FIG. 6 is a top plan view of the seat for aircraft of FIG. 1, showing the continuation of the pivoting movement of FIG. 5.

The pivoting of the folding table 28 begins in FIG. 5 and ends in FIG. 6. This pivoting action reveals two supplemental cup holders 70 provided in the top surface of the armrest 22. This pivoting action (see arrows 72 and 74) is caused by a manual force (see arrow 76) applied by the user.

Figure 7:
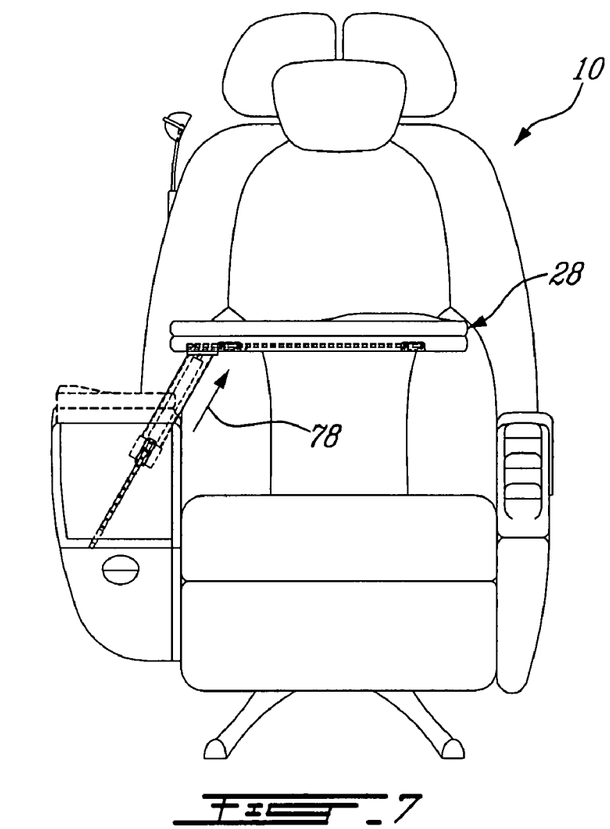
FIG. 7 is a front elevational view of the seat for aircraft of FIG. 1, showing the raising of the folding table.

FIG. 7 illustrates, in a front elevational view, the raising of the folding table 28 (see arrow 78). As mentioned hereinabove, the position of the folding table 28 may be locked by the user via a locking mechanism (not shown).

It is to be noted that the folding table 28 could be raised before it is pivoted depending on the wishes of the user.

Figure 8:
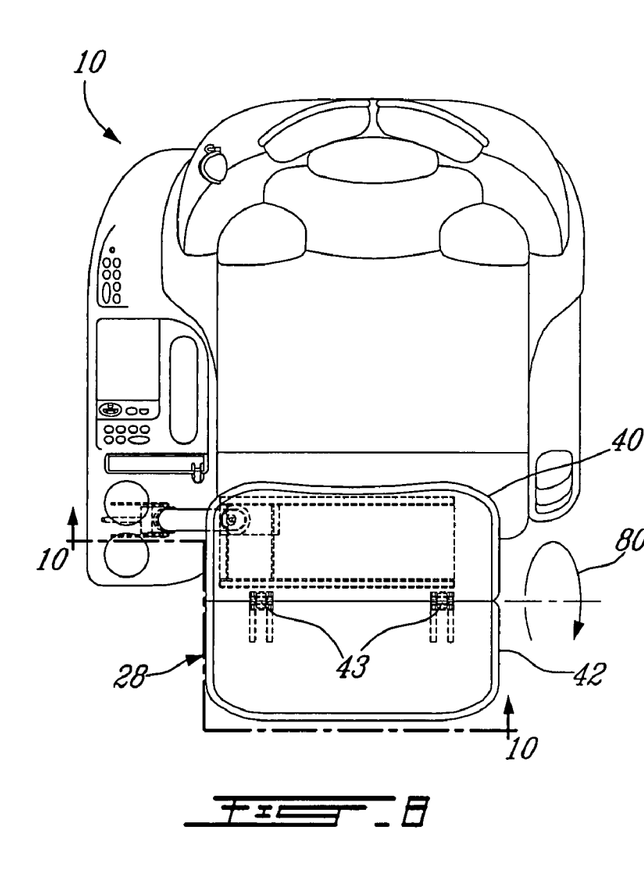
FIG. 8 is a top plan view of the seat for aircraft of FIG. 1, showing the unfolding of the folding table.

The unfolding of the folding table 28 is illustrated in FIG. 8. To do this, the front table portion 42 is pivoted (see arrow 80) about the hinges axis.

Finally, in FIG. 9, the unfolded table 28 may be moved (see double arrow 82) according to the wishes of the user.

It is to be noted that since the vertical adjustment occurs on the angled axis of the telescopic arrangement 46, the generally horizontal position of the table 28 is maintained.

As will easily be understood by one skilled in the art, the cylinder 60 and piston 66 arrangement may be a gas cylinder selected to assist in the raising of the table 28.

The structure of the folding table 28 is generally designed to sustain the loads induced by the seat occupant normal activities (eating/working) and the ground, flight, and emergency landing loading conditions. The table hinges 43 are generally designed to prevent sagging and to maintain a level work surface with up to about 25 lbs of distributed load.

Figure 11:
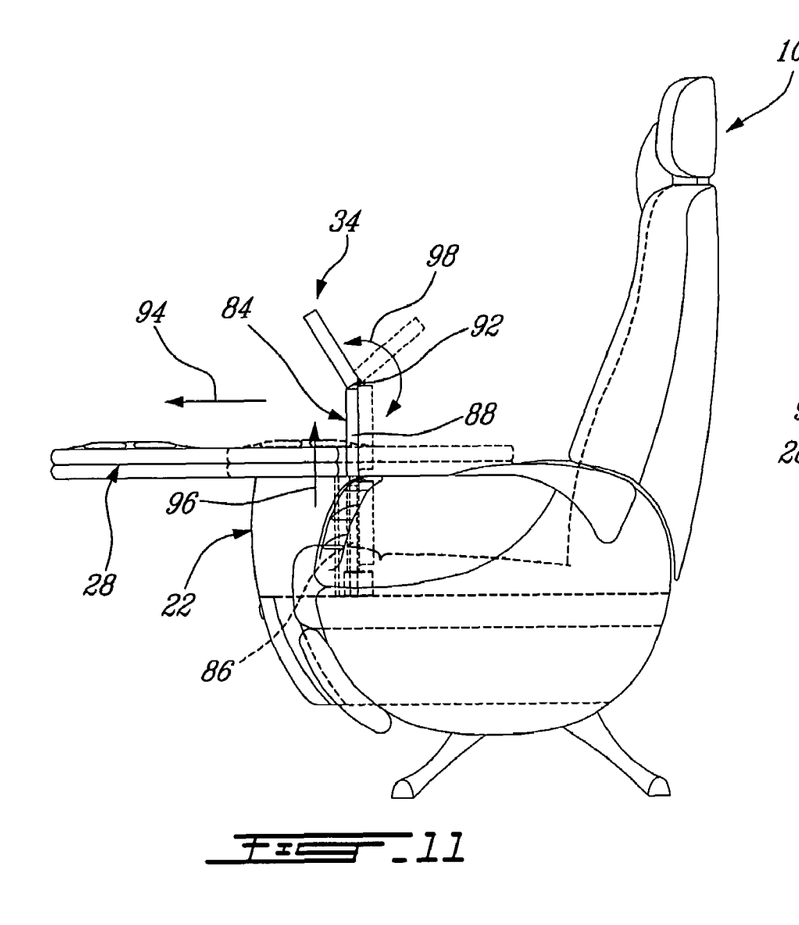
FIG. 11 is a side elevational view of the seat for aircraft of FIG. 1, showing the raising of the monitor.
Figure 12:
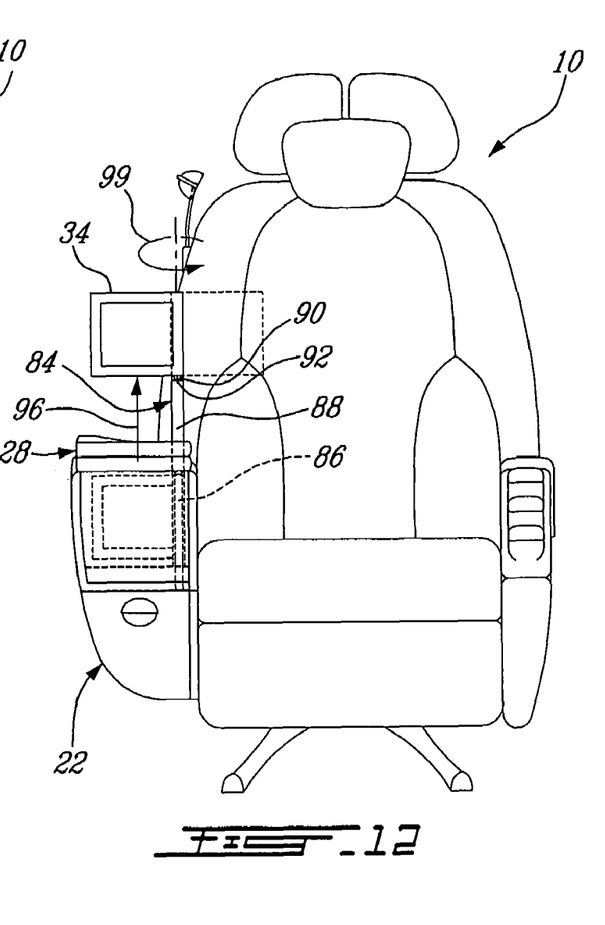
FIG. 12 is a front elevational view of the seat for aircraft of FIG. 1, showing the monitor in a fully raised position.

Turning now to FIGS. 11 and 12 of the appended drawings, the monitor 34 will be described. The monitor 34 is mounted to a retractable and pivoting support assembly 84 that includes a telescoping piston 86 mounted inside a cylinder 88. The distal end of the piston 86 is secured to the armrest 22.

The proximate end 90 of the cylinder 88 is connected to a hinge 92 that allows the monitor 34 to be folded onto the cylinder 88 to be stowed inside the armrest 22. The hinge 92 also allows the monitor 34 to be tilted backward for a better viewing angle.

Therefore, to use the monitor 34, a user slides the folding table 28 along its longitudinal axis (see arrow 94), pulls the monitor 34 upwardly (see arrow 96) and then unfolds the monitor 34 with respect to the cylinder 88 (see arrow 98). It is to be noted that the pulling action is assisted by the piston cylinder arrangement that may be selected accordingly.

As can be seen from FIG. 12, the monitor 34 is so mounted to the hinge 92 that it can pivot about a generally vertical axis (see arrow 99).

It is to be noted that the monitor 34 may optionally include a touch screen complementing or replacing some of the audio-video controls 36.

The structure of the armrest 22 is generally designed to sustain the loads induced by the seat occupant normal activities, provide fixation to the seat assembly, provide articulation and guidance for the adjustable elements (for example the table 28 and monitor 34), and be capable of withstanding abuse loads such as for example the ones specified in the SAE AS8049 performance standards.

Also, the outboard armrest 22 of the seat 10 is generally made of molded parts and hidden fasteners which are designed for ease of maintenance assembly and upholstery. This design generally simplifies the process of completing the interior of the cabin of an aircraft or gives to a business airplane a quality fit and finish which significantly minimizes or eliminates visible fasteners.

Figure 13:
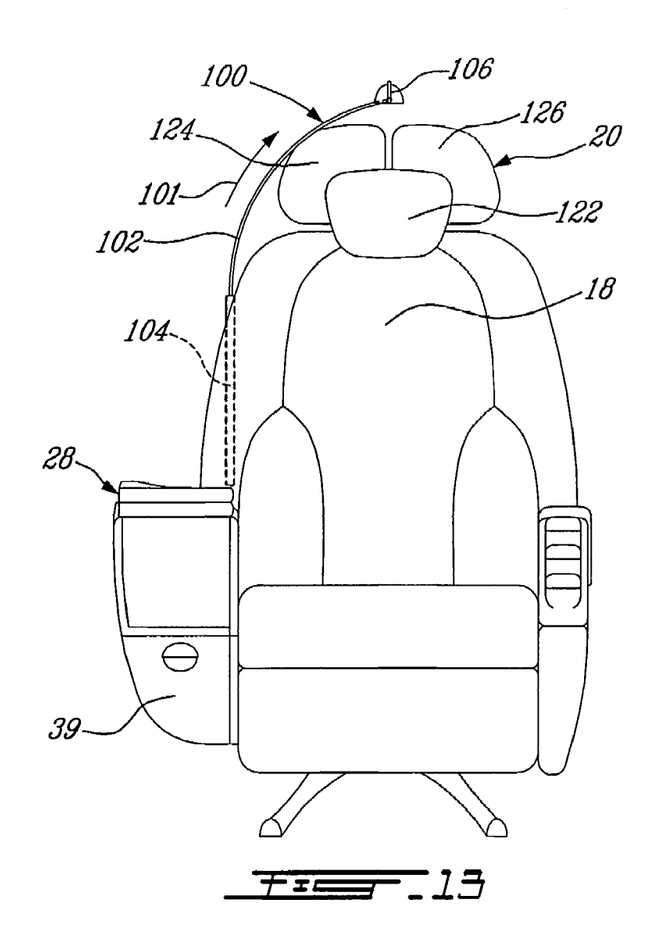
FIG. 13 is a front elevational view of the seat for aircraft of FIG. 1, showing the extension of the reading lamp.
Figure 14:
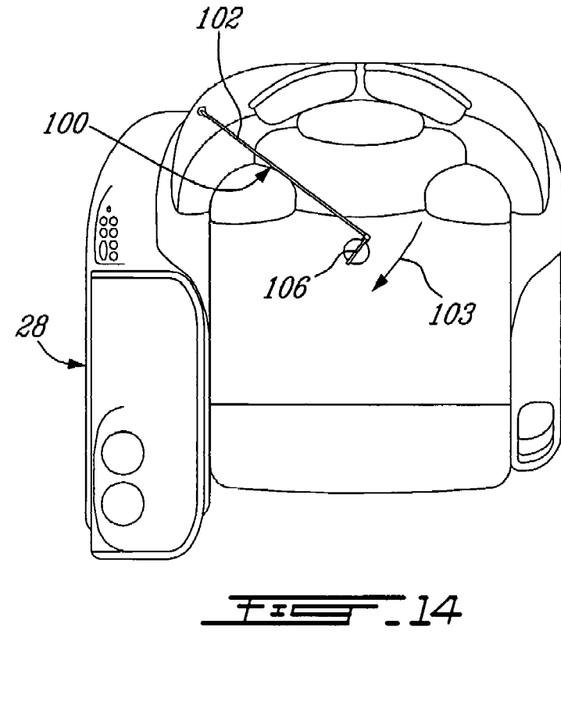
FIG. 14 is a top plan view of the seat for aircraft of FIG. 1, showing the rotation of the extended reading lamp.

In addition to the outboard armrest 22, the illustrative embodiment of the multi-functional seat 10 for an aircraft, includes a personal reading light assembly 100 with multi-directional adjustments, shown in FIGS. 13 and 14.

The light assembly 100 includes a retractable and/or telescopic arm 102, a recessed pocket 104 which is located in the outboard profile of the back rest 18, an adjustable light fixture 106 which generates suitable light intensity for reading and suitable light color characteristics for optimum performance.

The retractable arm 102 may be recessed into the pocket 104 of the seat back rest 18 in instances such as take off and landing (FIG. 1). The retractable arm 102 and light 106 are deployed (see arrow 101 in FIG. 13) for passenger use.

Adjustment or movement of the reading light assembly 100 is made through elevation and forward arc movement of the telescopic arm 102. Also, the shape of the retractable arm 102 is generally designed to adjust to the passenger's reading/view path. The light fixture 106 may also be pivoted along the axis of the telescopic arm 106 for proper light direction adjustment (see arrow 103 in FIG. 14).

The arched shape of the seat backrest 18 and recessed pocket 104 enables the telescopic arm 102 of the light assembly 100 to elevate and move on a curved axis simultaneously. The retractable arm 102 may be manually pulled out of its pocket 104 by the seat occupant. The tilting or pivoting articulation of the light fixture 106 may be manually adjusted by the passenger.

The reading light assembly 20 is generally evaluated for the applicable environmental conditions and test procedures of such as for example the RTCA/DO-160 requirements.

Figure 15:
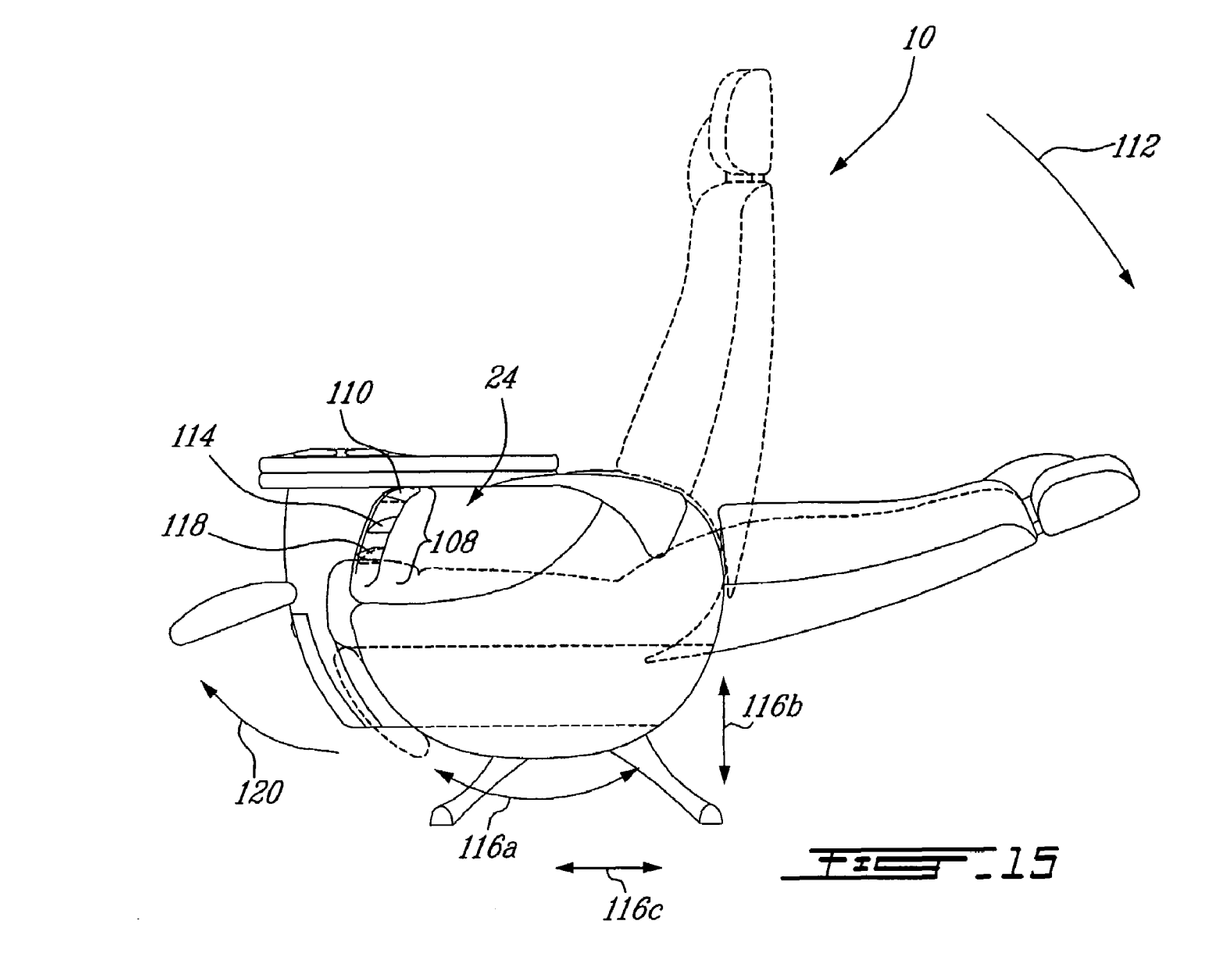
FIG. 15 is a side elevational view of the seat for aircraft of FIG. 1, showing the movements of the backrest and of the leg rest.

The aircraft seat 10 includes lever controls 108 which are mounted to the inboard armrest 24, as can be seen in FIGS. 1 and 15.

As can be better seen from FIG. 15, the lever controls 108 include a first or upper lever 110 for control of the seat backrest positions (see arrow 112), a second or intermediate lever 114 for control of the seat assembly tracking and swiveling positions (see arrows 116A, 116B and 116C) and a third or lower lever 118 for control of the seat leg rest support positions (see arrow 120).

Generally stated, the lever controls 110, 114 and 118 are controlled by the occupant to allow movements of the various seat parts in order to improve the occupant's comfort when installed in the seat.

The positions of the seat 10 may range from an upright position such that the seat 10 faces forward or aft of the aircraft for taxi, take-off, and landing operations, to a partially reclined position for in-flight operations, within a certain range, and to a fully berthed position providing a generally horizontal surface for sleeping. It is to be noted that the legrest may also adopt a fully horizontal position for sleeping. Between these upright and horizontal positions, the backrest may be provided with attenuated spring assisted inclination adjustment range.

The mechanical linkage and locking mechanisms of the aircraft seat 10 are not illustrated or described further herein since they are believed well known to those skilled in the art.

Returning to FIG. 13 an adjustable headrest 20 which generally sustains the load induced by the seat occupant's head for forward and aft seating cabin seats 10 will be described.

The adjustable headrest 20 is manually moved by the passengers and is part of or mounted to the backrest 18, includes an adjustable neck support 122 and a pair of lateral head supports 124, 126 that are generally retractable.

The neck support 122 can be vertically adjusted separately from the lateral supports 124, 126 and it is generally part of or mounted to the seat backrest 18 via fixations (not shown).

The lateral head supports 124, 126 generally include variable locking positions and tubular arms (not shown) which are mounted or hinged to the seat backrest 18, such that the lateral head supports 124, 126 can independently pivot from their respective pivot axes (not shown), and may then be locked to that position.

Also, the lateral head supports 124, 126 are generally connected together for height adjustment and can be raised up from the seat backrest 18. It generally provides an adequate continuous back support as specified for example by the Federal Aviation Administration regulations.

The headrest 20 generally adequately supports the head during impact as specified by such as for example the Federal Aviation Administration regulations and the headrest also generally locks in the fully upright position as specified by such as for example the Federal Aviation Administration regulations.

Returning briefly to FIG. 1 of the appended drawings, the seat base 12 generally comprises legs that are secured to the aircraft on a pair of longitudinal rails (not shown) integrated in the cabin floor (as standard practice). The lower leg extremity (not shown) are generally designed to account for floor deformation requirements and attachment safety factors required by such as for example the FAA regulations.

The seat base 12 of the aircraft seat 10 generally sustains the loads induced by the seat occupant during ground, flight and emergency landing load conditions. Also, the exposed seat base structure 2 generally provides cabin openness, reduces the bulkiness of the seat 10 and enhances the shape of the seat and its movements. The air circulation in the cabin is also better since the airflow is not blocked.

The aircraft seat 10 includes a conventional seat occupant restraint system (not shown) such as a two or three point passenger restraint system which includes a lap belt strap which may be adjustable by the occupant.

The restraint system may optionally include a conventional shoulder restraint which generally automatically retracts to the top of the backrest 18 once released from its connection to the lap belt.

The restraint system may optionally include webbing generally designed to support the ultimate loads and limit the passenger motion during impact, considering the emergency landing conditions specified by such as for example the FAA regulations.

The aircraft seat 10 includes an electrical system having a single point of connection (not shown) to the aircraft wiring loom for all the electrical equipment. Usually, the connection takes place in the lateral wall of the cabin outboard of the seat. The seat wiring loom generally has sufficient servicing loop out of the seat 10 to enable removal of the connections and ease of maintenance.

Generally, the electrical connection is the same, regardless of the options fitted to the seat and the wiring looms are routed with proper loops and fixation to ensure adequate operation.

The various electrical systems and components may be qualified to the applicable sections of such as for example RTCA/DO-160 of the latest revision required for evaluation of environmental conditions and test procedures for airborne equipment. However, other electrical system function and certification such as for example the applicable Federal Aviation Administration regulations is generally the responsibility of the installer.

More generally, the illustrative embodiment of the whole assembly of the aircraft seat 10 according to the present invention comprises, amongst others, general functions or provisions such as for example upholstery ergonomics to fit passenger sizes ranging from 5th percentile females to 95th percentile males. The seat 10 may be upholstered with comfortable fabric and/or leather dress covers to maximize the quality fit and finish which may have no visible fasteners.

The whole assembly of the seat 10 generally provides articulations or guidance for the adjustable/displaceable items as mentioned hereinabove. Also, the seat 10 may provides lumbar support on the backrest 18 with electrical actuation adjustments in protrusion and elevation, may provides fixation for the armrest integrated elements and systems, may provide for an aisle light and may provides stiffness, robustness, tightness or no looseness, in linkage and connections between sub-assemblies and accessories fixation of the seat 10.

As described hereinabove, the whole assembly of the seat 10 may be displaced in translation in a generally horizontal plane with respect to the aircraft (not shown) and may be swiveled around a generally vertical axis.

The translations and rotations are generally driven by the occupant of the seat 10 and when moved, any static position of the seat 10 may be positively locked. The unlocking of the seat 10 position may be mechanically or electrically controlled. The translation and rotation movements and the locking engagement are generally easy, smooth and silent when operated.

The whole assembly of the seat 10 generally sustain the loads induced by the seat occupant during all the phases of the ground and flight operations, taking into account the various positions the seat 10 may adopt and the emergency landing conditions specified by such as for example the FAA regulations.

Finally, the seat 10 may meet industry accepted performance standards specified in such as for example the Society of Automotive Engineers and Aerospace Standard document number AS 8049 of the latest revision. The seat 10 may also be certified for the applicable Federal Aviation Administration regulatory requirements of 14 CFR part 25; 25.561, 25.562, 25.785, including the latest applicable amendments.

Figure 16:
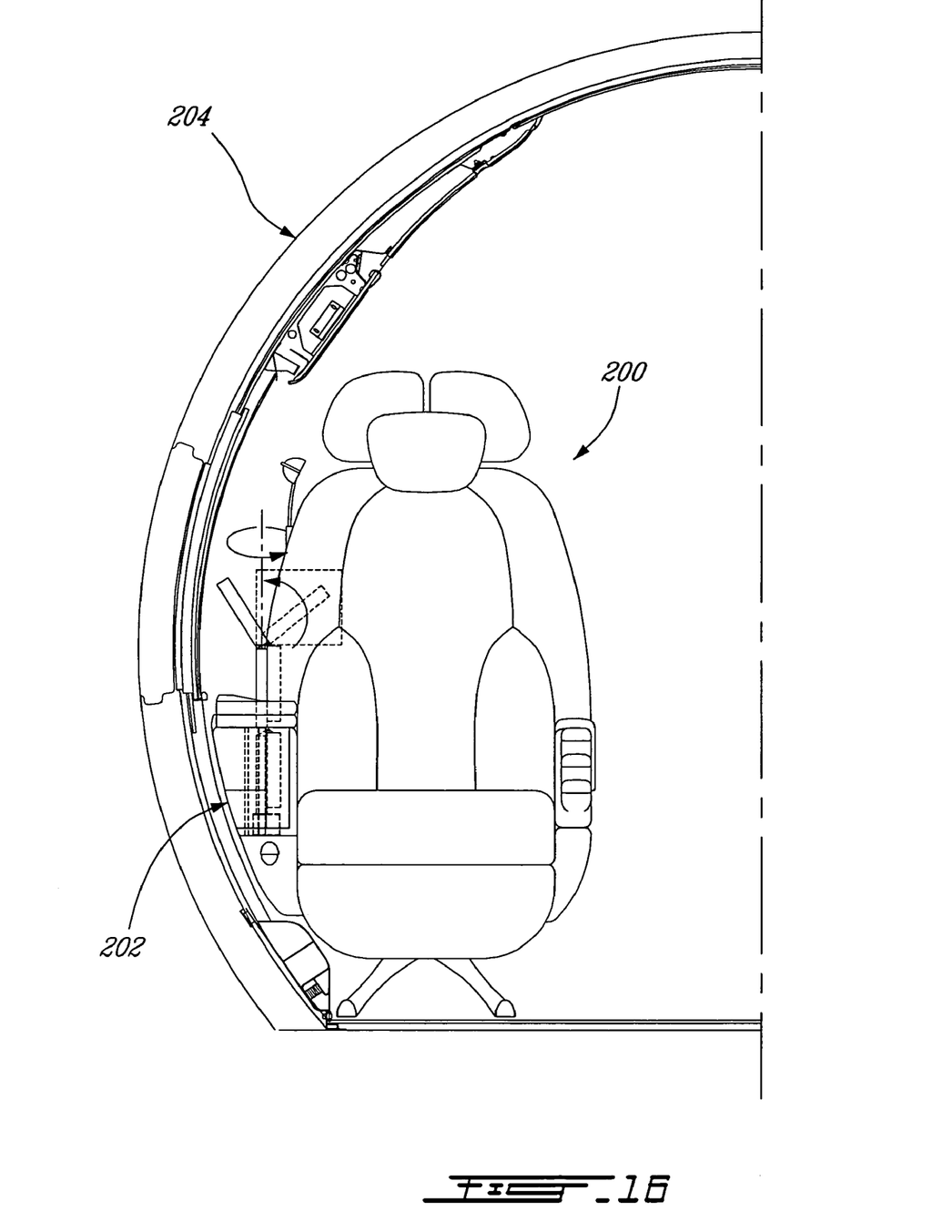
FIG. 16 is a front elevational view of a seat for aircraft similar to the seat of FIG. 1 but configured for a different aircraft.
Figure 17:
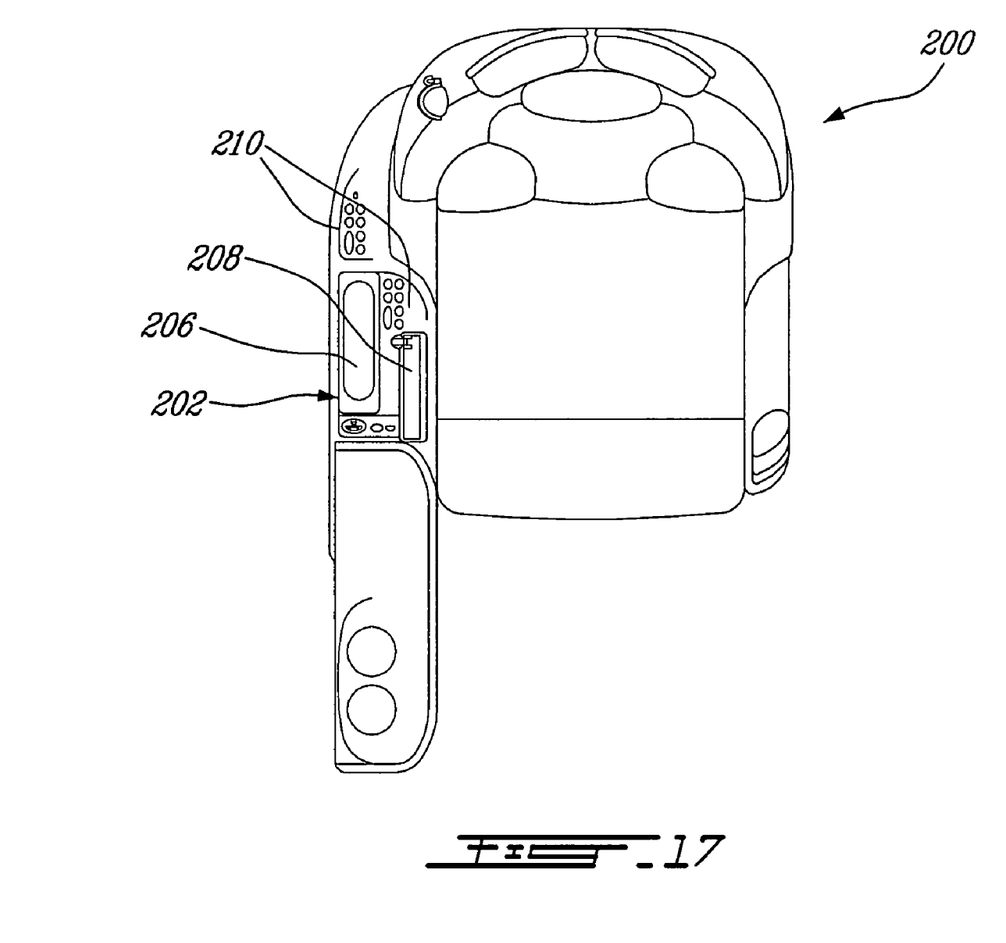
FIG. 17 is a top plan view of the seat for aircraft of FIG. 16.

Turning now briefly to FIGS. 16 and 17 of the appended drawings an aircraft seat 200 according to a second embodiment of the present invention will be described.

The seat 200 is very similar to the seat 10 described hereinabove. Accordingly, only the difference between these two seats will be described herein below.

Generally stated, the seat 200 has the same features and elements as the seat 10 but they are configured to fit in a narrower outboard armrest 202 since the seat 200 is designed to be installed in a narrower aircraft 204.

More specifically, as can be seen from FIG. 17, the telephone handset 206, the monitor 208 and the audio-video controls 210 are positioned differently.

Although the present invention has been described in the foregoing specification by means of an illustrative embodiment, this illustrative embodiment can be modified as will, without departing from the spirit and nature of the subject invention.

What is claimed is:

1. An aircraft seat comprising a seat base, a seat portion mounted to said seat base, a backrest portion cooperating with said seat portion for receiving a person in a seated position, an armrest defining a top portion, a folding table supported by said armrest movable between a stowed position where said folding table covers said top portion of said armrest and an operational position adapted for use by said seated person, wherein said armrest has a top wall in said top portion, and wherein said folding table overlies said top wall, said folding table having a sliding arrangement for sliding away front and parallel to said top wall between said stowed position and said operational position, and wherein said folding table is mounted to said armrest by a telescoping arrangement having a first end attached to said armrest and a second end attached to said folding table, and wherein said telescoping arrangement extends upwardly allowing said folding table to be raised away from and parallel to said top wall.

2. An aircraft seat as recited in claim 1, wherein said folding table includes front and rear longitudinal table potions interconnected by hinges.

3. An aircraft seat as recited in claim 1, further including a monitor so mounted to said armrest as to be movable between a stored position where said monitor is enclosed in said armrest to an operational position.

4. An aircraft seat as recited in claim 3, wherein said monitor is mounted to said armrest via a retractable and pivoting support assembly.

5. An aircraft seat as recited in claim 4, wherein said retractable and pivoting support assembly includes:
   a piston mounted to said armrest;
   a cylinder coaxially mounted to said piston; said piston and cylinder having a telescoping relationship;
   a hinge mounted to a free end of the cylinder; said monitor being so mounted to said hinge that it pivots between a folded position where it lies generally adjacent to said cylinder and an unfolded position;
   wherein a) said monitor is in said stored position when it is pivoted to said folded position and said piston is telescopically enclosed in said cylinder; and b) said monitor is in said operational position when the piston is extended from said cylinder and the monitor is pivoted to said unfolded position.

6. The aircraft seat as recited in claim 1, wherein said telescoping arrangement includes a pivoting element at said second end attached to said folding table, said pivoting element defining a vertical axis and allowing said folding table to pivot about said vertical axis generally horizontally.

7. An aircraft seat as recited in claim 6, wherein said telescoping arrangement comprises a pair of rails mounted to said armrest, a block slidingly mounted to said pair of rails, a piston fixedly mounted to said block, and a cylinder coaxially mounted to said piston, said piston and cylinder having a telescoping relationship, said pivoting element being mounted to a free end of said cylinder.

8. The aircraft seat as recited in claim 6, wherein said pivoting element is attached to said sliding arrangement.

9. The aircraft seat as recited in claim 8, wherein said folding table defines a longitudinal axis and a transversal axis, and wherein said sliding arrangement is slidable along said longitudinal and said transversal axes.

10. An aircraft seat as recited in claim 9, further comprising a locking arrangement configured and sized to selectively lock position of said folding table.

11. The aircraft seat as recited in claim 9, wherein said sliding arrangement includes a sliding element configured to be received in a channel provided in a bottom surface of said folding table and a bracket mounted to said sliding element, said sliding element for sliding along said longitudinal axis and said bracket for sliding relative to said sliding element along said transversal axis, and wherein said pivoting element is attached to said bracket.

12. The aircraft seat as recited in claim 1, further comprising a backrest portion mounted to said seat base and being pivotable between a fully upright position and a fully reclined position.

13. An aircraft seat as recited in claim 12, further comprising an adjustable headrest mounted to said backrest portion.

14. An aircraft seat as recited in claim 12, further comprising a light assembly mounted to said backrest portion.

15. An aircraft seat as recited in claim 14, wherein said light assembly includes a retractable arm having a proximate end mounted to said backrest portion and a distal end to which a light fixture is mounted.

16. An aircraft seat as recited in claim 15, wherein said retractable arm has a generally arched shape and is pivotally mounted to said backrest.

17. The aircraft seat as recited in claim 1, wherein said armrest further defines an enclosure and comprises a component in said enclosure for use by said seated person, said foldable table in said stowed position covering said top portion of said armrest covering said component in said armrest, and said foldable table in said operational position uncovering said component allowing access thereto.

18. An aircraft seat as recited in claim 17, wherein said component in said armrest is selected from the group consisting of a cup holder, a monitor, a telephone handset, a storage compartment, audio-video controls, modem connection, printer connection, lighting controls and seat controls.

19. An armrest for an aircraft seat defining a top portion and an enclosure and comprising at least one component in said enclosure for use by a person seated in said aircraft seat, a folding table movable between a stowed position where said folding table covers said top portion of said armrest enclosing said component in said armrest and an operational position adapted for use by a person seated in said aircraft seat, said folding table in said operational position uncovering said component allowing access thereto; wherein said folding table is mounted to said armrest by a telescoping arrangement having a first end attached to said armrest and a second end attached to said folding table, and wherein said telescoping arrangement extends upwardly allowing said folding table to be raised away from and parallel to said top portion.

\* \* \* \* \*